Patented Dec. 21, 1937

2,102,638

UNITED STATES PATENT OFFICE 2,102,638

HYDRAULIC FLUID

Douglas V. Moses, Wilmington, Del., assignor to E. I. du Pont de Nemours & Company, Wilmington, Del., a corporation of Delaware No Drawing. Application February 24, 1933, Serial No. 658,440. Renewed December 8, 1936

10 Claims. (Cl. 252—5)

This invention relates to compositions of matter and more particularly to fluids especially desirable for use in hydraulically operated apparatus, such, for example, as shock absorber systems, and the like.

It has previously been proposed to use solutions of varying compositions for resisting high velocity hydraulic flow in systems adapted to absorb energy. Liquids and solutions for this purpose, however, have been characterized in the past by numerous disadvantages, such, for example, as gasification at higher temperatures, tendency toward solidification of such materials at the lower temperatures, and undesirably wide change in viscosity at varying temperatures, and the like. Of even more disadvantage, perhaps, has been the effect of such materials or solutions upon the metallic parts with which they come in contact.

With the intent to eliminate the disadvantages of hydraulic fluids previously proposed, it is an object of this invention to provide a new and improved hydraulic fluid possessing a plurality of advantageous characteristics.

Other objects and advantages of this invention will be apparent by reference to the following specification and appended claims.

According to this invention a highly desirable fluid for use in hydraulic energy absorption systems, such as door checks, shock absorbers, or the like, free from the disadvantages of the prior proposals hereinbefore outlined, is obtained by mixing a monohydric alcohol, a blown fish or vegetable oil, such as rapeseed, tung, castor, soya bean, corn, cottonseed, and the like, and a soap. The word "soap" as used in this specification will be understood to have a broad meaning and to comprise thereunder such well known soaps as the laurates, stearates, palmitates, sulfonates, and the like and as well alkali salts of the acids producible from the higher alcohols obtainable in the well known synthesis of methanol by catalytic hydrogenation of oxides of carbon.

According to this invention, therefore, there may be added to a monohydric alcohol-blown oil mixture, a soap such as sodium laurate, potassium laurate, sodium stearate, sodium palmitate, potassium stearate, potassium palmitate, sodium or potassium petroleum sulfonate, a soap known under the trade marked name "Supersuds", etc.

The range of proportions of the constituents of my invention will be understood to vary widely. Furthermore, as an added advantage of the practice of my invention the soap constituents thereof may, if desired, be formed in situ, i. e. by the addition of the alkali such as caustic soda or potash, or the like, to the alcohol previous to admixture thereof with blown oil, or, if desired, by addition of the alkali to the completely mixed fluid.

Compared with hydraulic fluids heretofore suggested the mixtures prepared according to this invention possess highly improved characteristics for utilization in hydraulic apparatus generally; thus, for example, the fluid of this invention does not precipitate under low temperatures, is free from objectionable gasification phenomena, and, moreover, exerts no disadvantageous corrosive action upon the metallic parts with which it comes in contact.

The material of this invention is further characterized by a highly desirable stability and non-gumming property after extended use.

Although the proportions of constituents of this invention may be varied widely, as hereinbefore described, I prefer to mix approximately 50 parts by volume of a mixture of aliphatic monohydric alcohols boiling in the range of about 233–273° C. and produced in the known synthesis of methanol by catalytic hydrogenation under pressure of oxide of carbon, with approximately 50 parts by volume of blown castor oil, and to approximately 98 parts by weight thereof to add 2 parts of sodium stearate. Likewise 46 parts by volume of a mixture of monohydric alcohols obtainable in the known catalytic synthesis under pressure of methanol from oxides of carbon and hydrogen and boiling in the range of about 233 to 273° C., may be mixed with approximately 46 parts by volume of blown rape seed oil and about 8 parts by volume of sodium petroleum sulfonate, to give a desirable hydraulic fluid.

Although the invention may be practiced by addition of soap to the other materials as described in the previous examples, the soap may be formed in situ equally as advantageously, if desired, such, for example, as by dissolving 1% by weight of sodium hydroxide in a mixture of monohydric alcohols boiling in a range of about either 157–195° C., or 195° C. and above, or 233–273° C. and obtainable in the known synthesis of methanol by catalytic hydrogenation of oxide of carbon under pressure, and mixing 50 parts by volume of said solution with 50 parts by volume of blown rape seed oil.

Although the examples are restricted to mixtures of higher boiling alcohols, by variation of the proportions between the alcohol or alcohols mixtures and the blown oil it is possible, according to this invention, to utilize either single or mixed monohydric aliphatic alcohols generally, including particularly the propyls, butyls, amyls, hexyls, and the like.

Various changes may be made in the proportions of materials hereinbefore referred to without departing from the invention or sacrificing any of the advantages thereof.

I claim:

1. A hydraulic fluid comprising a solution of an aliphatic monohydric alcohol, a blown oil, and a soap.

2. A hydraulic fluid comprising a solution of an aliphatic monohydric alcohol, a blown oil, and sodium petroleum sulfonate.

3. A hydraulic fluid comprising a solution of a mixture of aliphatic monohydric alcohols, a blown oil, and a soap.

4. A hydraulic fluid comprising a solution of a mixture of higher boiling aliphatic monohydric alcohols, a blown oil, and a soap.

5. A hydraulic fluid comprising a solution of a mixture of higher boiling aliphatic monohydric alcohols, blown castor oil, and sodium petroleum sulfonate.

6. A hydraulic fluid comprising a solution of a mixture of higher boiling aliphatic alcohols, obtainable in the synthesis of methanol by catalytic hydrogenation of carbon oxide under pressure, a blown oil, and a soap.

7. A hydraulic fluid comprising a solution of a mixture of higher boiling aliphatic alcohols, obtainable in the synthesis of methanol by catalytic hydrogenation of carbon oxide under pressure, a blown oil, and sodium petroleum sulfonate.

8. A hydraulic fluid comprising a solution of a mixture of higher boiling aliphatic alcohols obtainable in the synthesis of methanol by catalytic hydrogenation of carbon oxide under pressure, blown rape seed oil, and sodium petroleum sulfonate.

9. A hydraulic fluid comprising a solution of a mixture of higher boiling aliphatic alcohols boiling in the range 233–273° C. and obtainable in the synthesis of methanol by catalytic hydrogenation of carbon oxide under pressure, blown rape seed oil, and sodium petroleum sulfonate.

10. A hydraulic fluid comprising a solution of a mixture of higher boiling aliphatic alcohols boiling in the range 233–273° C. and obtainable in the synthesis of methanol by catalytic hydrogenation of carbon oxide under pressure, blown rape seed oil, and sodium petroleum sulfonate, in the proportions of about 8 parts by volume of sodium petroleum sulfonate per 92 parts of alcohols-blown rape seed oil mixture.

DOUGLAS V. MOSES.